United States Patent
Bogenberger et al.

(10) Patent No.: US 8,060,654 B2
(45) Date of Patent: Nov. 15, 2011

(54) NETWORK AND METHOD FOR SETTING A TIME-BASE OF A NODE IN THE NETWORK

(75) Inventors: Florian Bogenberger, Poing (DE); Mathias Rausch, Markt Schwaben (DE)

(73) Assignee: Freescale Semiconductor, Inc, Austin, TX (US)

( * ) Notice: Subject to any disclaimer, the term of this patent is extended or adjusted under 35 U.S.C. 154(b) by 256 days.

(21) Appl. No.: 12/513,089

(22) PCT Filed: May 14, 2007

(86) PCT No.: PCT/IB2007/051823
§ 371 (c)(1),
(2), (4) Date: Apr. 30, 2009

(87) PCT Pub. No.: WO2008/053378
PCT Pub. Date: May 8, 2008

(65) Prior Publication Data
US 2010/0001770 A1    Jan. 7, 2010

(30) Foreign Application Priority Data
Oct. 31, 2006    (WO) .................. PCT/IB2006/054024

(51) Int. Cl.
*H03L 7/00* (2006.01)
(52) U.S. Cl. ........ 709/248; 370/509; 370/503; 327/144; 327/258; 327/295; 327/296; 327/297; 341/100; 341/101
(58) Field of Classification Search .................... 709/248
See application file for complete search history.

(56) References Cited

U.S. PATENT DOCUMENTS

| | | |
|---|---|---|
| 5,694,542 A | 12/1997 | Kopetz |
| 5,848,028 A | 12/1998 | Burklin |
| 6,981,088 B2 | 12/2005 | Holm et al. |
| 7,000,045 B2 | 2/2006 | Holm et al. |
| 7,305,510 B2 | 12/2007 | Miller |
| 7,346,723 B2 | 3/2008 | Kim et al. |
| 2002/0023186 A1 | 2/2002 | Kim |
| 2002/0062414 A1 | 5/2002 | Hofmann et al. |
| 2003/0043790 A1 | 3/2003 | Gutierrez |
| 2005/0055469 A1 | 3/2005 | Scheele |
| 2005/0259722 A1 | 11/2005 | Vanlonden et al. |

(Continued)

FOREIGN PATENT DOCUMENTS
EP    0394051 B1    7/1996
(Continued)

OTHER PUBLICATIONS

Eriksson et al; "A communication protocol for hard and soft real-time systems" IEEE Proceedings of the Eighth Euromicro Workshop; California, USA, Jun. 1996.

(Continued)

*Primary Examiner* — Jude Jean Gilles

(57) ABSTRACT

A data communication network may include two or more master clocks, and a synchronization system connected to the master clocks. The synchronization system may determine a time-base for the master clocks. The synchronization system may control the master clocks according to the determined time-base. The data communication network may include one or more slave clocks. The slave clocks may be controlled by a slave clock time-base controller based on time information of a single selected master clock selected from the master clocks.

20 Claims, 4 Drawing Sheets

U.S. PATENT DOCUMENTS

| | | |
|---|---|---|
| 2006/0112205 A1 | 3/2006 | Chang et al. |
| 2007/0174608 A1 | 7/2007 | Balandin et al. |
| 2009/0228732 A1* | 9/2009 | Budde et al. ............... 713/400 |
| 2010/0073043 A1* | 3/2010 | Bogenberger et al. ...... 327/144 |

FOREIGN PATENT DOCUMENTS

| | | |
|---|---|---|
| EP | 1179920 A2 | 2/2002 |
| EP | 1355458 B1 | 9/2005 |
| EP | 1355460 B1 | 10/2005 |
| EP | 1355459 B1 | 12/2005 |
| EP | 1355461 A2 | 7/2007 |
| EP | 1280024 B1 | 4/2009 |
| WO | 2005119951 A | 12/2005 |
| WO | 2008053277 A1 | 5/2008 |

OTHER PUBLICATIONS

Kopetz et al; "Clock Synchronization in Distributed Real-Time Systems"; IEEE Transactions on Computers, vol. C-36, No. 8, Aug. 1987, pp. 933-940.

PCT/IB2007/51823 International Search Report mailed Sep. 24, 2007.

* cited by examiner

NETWORK AND METHOD FOR SETTING A TIME-BASE OF A NODE IN THE NETWORK

FIELD OF THE INVENTION

This invention relates to a network, a node for in a network, a time-base controller, a kit of parts, an apparatus, a method for setting a time-base and a computer program product

BACKGROUND OF THE INVENTION

In communication networks, such as computer networks or other data communication networks, accurate timing is often required, for example to facilitate event synchronization and data correlation. Typically, the nodes in the network include an internal clock which provides a local time-base. In theory, if two internal clocks are initially set to a common time-base and their frequency sources are running at exactly the same rate, they would remain synchronized. In practice, however, clocks are set with limited precision, frequency sources run at different rates due to initial manufacturing tolerance, changes in temperature or pressure, and aging. Because of these inherent instabilities, a repeated synchronization may be used to maintain a correspondence between the local time-bases of the nodes in the network.

To set the nodes in the network to a common time-base, so called 'master-slave synchronisation' is known. In a master-slave synchronisation system, the nodes are connected to a common source. The common source provides a common time-base to the nodes, and hence operates as a master, whereas the nodes set their internal time-base to the received common time-base and hence act as slaves. However, a disadvantage of such a synchronisation is that in case the common source fails, the nodes will not be synchronised.

For example, International Patent Application WO 2005/119951 discloses a method for establishing a global time base in a timed communications system comprising several subscribers. One of the subscribers of the communications system is defined as the time master, with which the remaining subscribers are synchronised. One or more additional subscribers are defined as a substitute time master. Firstly, an attempt is made to synchronise all subscribers of the communications system with the primary time master. If the attempt fails, a next respective substitute time master in a predetermined sequence is selected and an attempt is made to synchronise all subscribers of the communications system with the selected substitute time master. However, a disadvantage of this master system is that while the synchronisation to the primary time master or the substitute time master may succeed, an error in the time base provided by the master will cause a malfunction of the timing in the network.

United States Patent Application Publication US 2005/005469 discloses a network with a master-slave configuration. Timers of a plurality of slave units are synchronized with a timer of the master unit. The network includes a middle hierarchical plane of units which act as slaves for the master unit, and are hence synchronised to the master unit, and as masters for the slave units. The slaves units are synchronised to the timer of a respective unit in this middle hierarchical plane to which they are connected, and hence indirectly to the master unit. However, a disadvantage of the system disclosed in this document is that in case the master unit fails, the entire timing in the network fails.

ERIKSON C ET AL: "*A communication protocol for hard and soft real-time systems*", REAL-TIME SYSTEMS, 1996, PROCEEDINGS OF THE EIGHTH EUROMICRO WORKSHOP ON L'AQUILA, ITALY 12-14 Jun. 1996, LOS ALAMITOS, Calif., USA, IEEE COMPUT. SOC, US, 12 Jun. 1996, pages 187-192, discloses a data communication system with a rotating master unit, that is during a first period of time a first unit acts as a master for the nodes in the system and during a second period of time succeeding the first period of time, a second acts as a master for the nodes in the system. However, a disadvantage of the system disclosed in this document is that in case the unit acting as master for the respective period of time fails, the entire timing in the network fails.

Accordingly, a common disadvantage of the prior art systems described above is that in case the master unit fails, the nodes will not be synchronised.

As an alternative to the master-slave synchronisation, so called 'distributed synchronisation' is known, for example from U.S. Pat. No. 5,694,542. In a network with distributed synchronisation, the nodes exchange timing information. Each node determines a time-base from the timing information received from the other nodes and adjusts its internal clock to the determined time-base. However, distributed synchronisation requires complex algorithms to determine the time-base. Furthermore, each node requires a synchronisation unit which can determine the time-base. Accordingly, a disadvantage of distributed synchronisation is that it is complex and requires a large amount of resources.

SUMMARY OF THE INVENTION

The present invention provides a network, a node for in a network, a time-base controller, a kit of parts, an apparatus, a method for controlling a time-base and a computer program product as described in the accompanying claims.

Specific embodiments of the invention are set forth in the dependent claims.

These and other aspects of the invention will be apparent from and elucidated with reference to the examples of embodiments described hereinafter.

BRIEF DESCRIPTION OF THE DRAWINGS

Further details, aspects and embodiments of the invention will be described, by way of example only, with reference to the drawings.

DETAILED DESCRIPTION OF THE PREFERRED EMBODIMENTS

Figure 1:
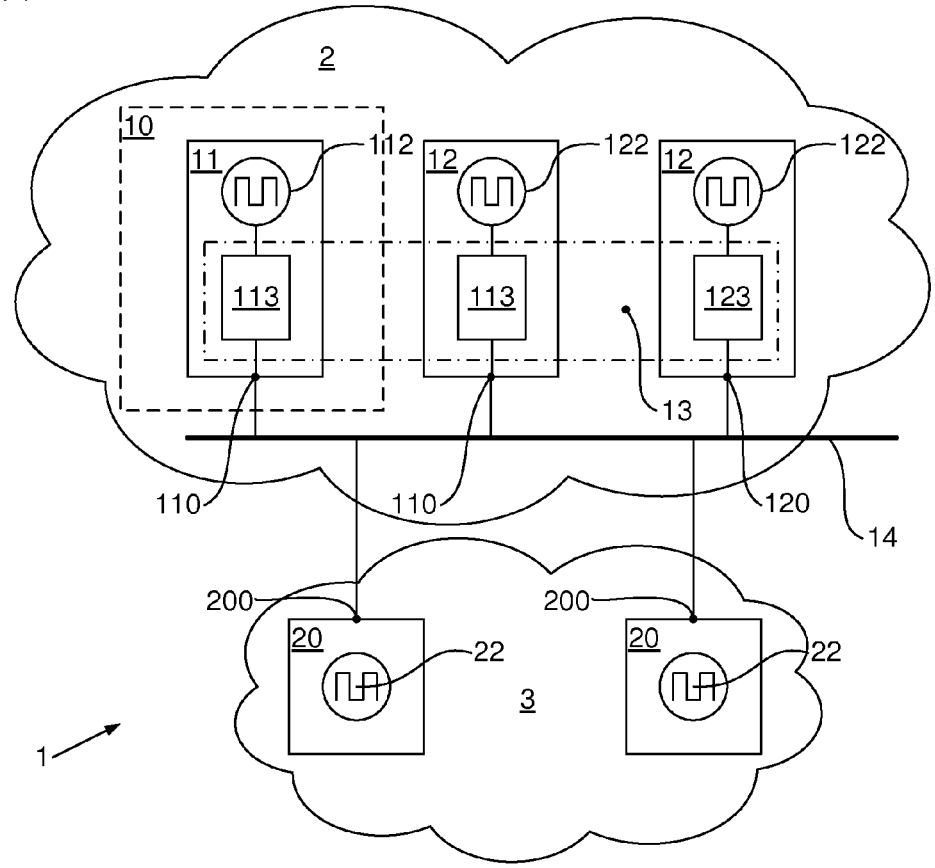
FIG. 1 shows a block diagram of an example of an embodiment of a network.

Referring to FIG. 1, a data communication network 1 is shown which includes a first sub-network 2 and a second sub-network 3. As shown in this example, the first sub-network 2 may for instance include one, two, or more than two first nodes 11,12. The second network 3 may include one or more second nodes 20. (In the example, two nodes 20 are shown, however it will be apparent that another number may likewise be present.) The network 1 may have any suitable topology and the first node(s) 11,12 and the second node(s) 20 may be connected to each other in any suitable manner. For instance, as shown in FIG. 1, the first nodes 11 may be connected to a bus 14 with respective communication ports 110,120 and the second node 20 may, for example, be connected to the bus 14 with a communication port 200. However, the nodes 11,12,20 may be connected to each other via other types of connections.

In the example of FIG. 1, the nodes of the first sub-network 2 and the second sub-network 3 are shown spatially separated from each other. However, the first sub-network 2 and the second sub-network 3 may have a spatial overlap. For example, the first nodes 11,12 and the second nodes 20 may be positioned in an interdigitated arrangement and/or first nodes 11,12 may be present at the same location as second nodes 20. It should be noted that the term 'node' as used in this application at least refers to any arrangement, including one or more elements, in a data communication network which provides network related functions and is administered as an entity in the network. A node may for example include a general purpose computer, a router, a switch, a bridge or other type of node.

The first nodes 11,12 may be of a different type than the second nodes 20 and/or the first sub-network 2 may be compliant with one or more standards which are different from one or more of the standards to which the second sub-network 3 complies. For instance, one or more of the first nodes 11,12 may be a node as defined in the FlexRay standard and/or one or more of the second nodes 20 may for example be a node which supports only parts of the FlexRay standard. However, it will be apparent that the invention is not limited thereto and that one or more of the nodes 11,12 in the first sub-network 2 and/or one or more of the nodes 20 in the second sub-network 3 may be other types of physical nodes or logical nodes.

As shown in FIG. 1, the first sub-network 2 may include two or more master clocks 112,122, and a synchronisation system 13 which is connected to the master clocks 112,122. The synchronisation system 13 can determine a time-base for the master clocks 112,122 and control the master clocks 112, 122 according to said determined time-base. Thereby, the clocks 112,122 can be synchronised to the determined time-base and hence to each other. As shown in the example of FIG. 1, the master clocks 112,122 may be provided in different first nodes 11,12 and the synchronisation system 13 may include synchronisation units 113 in different first nodes 11,12. However, it is also possible that a node 11,12 includes two or more master clocks 112,122.

As shown in FIG. 1, the second sub-network 3 may be connected to the first sub-network 2 and may include one or more slave clocks 22. In the example of FIG. 1, for instance, two slave clocks 22 are shown, each present in a different second node 20. However, it is also possible that one or more of the second nodes 20 each include two or more slave clocks 22. As is explained below in more detail, the slave clocks 22 may be connected to a slave clock time-base controller 21. The slave clock time-base controller 21 may control the time base of the slave clock 22 based on time information from a single selected master clock 112. Thereby, the slave clock time-base controller 21 does not need to have a complex synchronisation system to determine the time-base suitable to synchronise the second clock 22, and accordingly the slave clock time-base controller 21 may be of a relatively simple design. Furthermore, the time-base of the second clock 22 may be controlled in a reliable manner.

The slave clock time-base controller 21 may be implemented in any manner suitable for the specific implementation.

Figure 2:
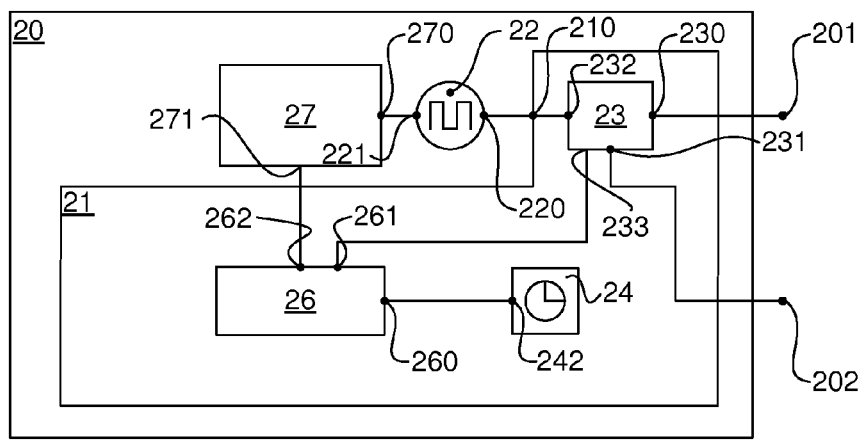
FIG. 2 shows a block diagram of an example of an embodiment of a second node.

The slave clock time-base controller 21 may for example be connected to the slave clock 22, and control the slave clock 22 based on the time-base information from the selected master clock 112. As shown in the example of FIG. 2, the slave clock time-base controller 21 may for instance be connected with a controller output 210 to a control input 220 of the slave clock 22, via which a clock control signal may be outputted to the slave clock 22. As shown in FIG. 2, the slave clock time-base controller 21 may for example form part of a second node 20 which further includes the slave clock 22 to which the slave clock time-base controller 21 is connected.

The slave clock time-base controller 21 may control the slave clock 22 in any manner suitable for the specific implementation. The slave clock time-base controller 21 may for instance include a clock controller 23. As shown in FIG. 2, the clock controller 23 may be connected with a first controller input 230 to an input 201 of the second node 20 (which in turn may be connected to a selected first node 11). A second controller input 231 may be connected to another input 202 of the second node 20. A clock controller output 232 may be connected to the control input 220 of the slave clock 22.

The clock controller 23 may receive, via the controller input 230 or 231, the time information from the selected master clock 112, for example from the synchronisation units 113 in the first node 11 to which the selected master clock 112 belongs, from hereon referred to as the selected first node 11. The clock controller 23 may compare the time-state of the slave clock 22 with the received time information. Based on the comparison, the clock controller 23 may adjust one or more parameters of the slave clock 22, via the controller output 232.

The time information from the master clock(s) 112,122 may be transmitted to the slave clock time-base controller 21 in any suitable manner. For instance, each of the first nodes 11,12 in the first sub-network 2 may transmit data representing information about the time-base, such as the phase and frequency thereof, of one or more of the master clocks 112, 122 used by the respective first node 11,12. The data may for example include the current time indicated by the local clock (s) 112 of the respective first node 11. For instance, the first nodes 11,12 may transmit clock data representing a current state of the master clock(s) 112,122 used by the respective node to other first nodes 11,12. The first nodes 11,12 may further send the clock data to the second nodes 20. The first nodes 11,12 may, for example, transmit a broadcast message to the nodes 11,12,20 in the network 1. The broadcast message may includes the current time indicated by the local clock(s) 112 of the respective first node 11. However, the first nodes 11,12 may transmit the information in any suitable manner.

The slave clock controller 21 may for example be connected to the first nodes 11,12 in such a manner that the slave clock controller 21 can receive messages from the first nodes 11,12 and process the messages originating from one or more of the first nodes 11,12. The slave clock controller 21 may set the time-base of the slave clock 22 in accordance with the time-base indicated by the message corresponding to the selected master clock 11. For instance, the first nodes 11,12 may broadcast respective messages to the nodes 11,12,20 in the network 1. The slave clock controller 21 may then select the messages which originate from the selected first node 11, for example based on the network address of the selected first node 11. The broadcast message may for example include the current time indicated by the respective master clock(s) 112 or another parameter suitable to control the time-base. The first nodes 11,12 may also, or alternatively, transmit the message in another manner and for example transmit the message only to a selected number of nodes 11,12 and 20 in the network 1, e.g. by transmitting the message to a specified address in the network 1.

For instance, the clock controller 23 may set the time and/or clock rate of the slave clock 22 to a time-stamp included in a message, e.g. originating from the selected first node 11, received at the respective input 201,202 of the second node 20. The time stamp may for example include values for the frequency (or rate) and/or the phase (or offset) of the selected master clock 112. The frequency (or rate) and/or the phase (or offset) of the slave clock 22 may then be set to the values in the time-stamp. The clock controller 23 may also perform a correction to the time-stamp. The correction may for example take into account the delay between the generation of the values and the reception by the clock controller 23.

The selected master clock 112 may be selected in any manner suitable for the specific implementation. For example, the slave clock time-base controller 21 may be preconfigured, prior to operation of the slave clock time-base controller 21, to select, as the selected master clock 112, a pre-selected one of the master clocks 112,122. For instance, the slave clock controller 23 may include a memory in which a predetermined network address of the node 11 with the select master clock 122 is pre-stored. The slave clock controller 23 may then, for example, receive time information from the other first nodes 11,12 in the network 1, but only use the messages originating from the node corresponding to the pre-stored address.

Alternatively, the slave clock time-base controller 21 may be configured to dynamically select the selected master clock 112, for example based on the received time information. In the example of FIG. 2, the clock controller 23 may for example determine which master clock 11,12 is selected, for instance from address information in messages containing the time-information received from the respective first nodes 11,12. The clock controller 23 may then control the slave clock 22 in accordance with the time information from the thus selected master clock.

The clock controller 23 may also determine the reliability of the time information received from a master clock, e.g. from the selected master clock. For example, the clock controller 23 may determine the difference in time indicated by the time information from two or more master clocks and compare this difference with a threshold value or other suitable criterion. In case the difference exceeds the threshold, the clock controller 23 may initiate an action, such as a reselection of the master clock, a change of the mode of the slave node into receiving only, a termination of the synchronisation of the slave clock to the master clock, or another suitable action.

The slave clock time-base controller 21 may for example select the selected master clock based on the received time information in any manner suitable for the specific implementation. In the example of FIG. 2, for instance, each of the second node inputs 201,202 may be connected to a respective one of the first nodes 11,12. (In the following, the term 'connected to a first node' is used for sake of clarity and briefness. However, it will be apparent that this may be any (direct or indirect) connection to a source of timing information from a (selected) master clock.) The slave clock time-base controller 21 can receive time information from the different first nodes 11,12 via the inputs 201,202. The slave clock time-base controller 21 may for example be configured to select, as the selected master clock 112, a master clock from which the time information is received first. For instance, the slave clock time-base controller 21 may select as the selected master clock, the master clock 112 corresponding to the first time-information received by the slave clock time-base controller 21 after a triggering event, such as a start-up of the second node 20 or a re-initialization of the slave clock time base.

The slave clock time-base controller 21 may be configured to control an operational mode of a unit, such as the second node 20, which includes one or more of the slave clocks 22.

As shown in FIG. 2, the slave clock time-base controller 21 may for example include a mode controller 26 which can control the operational mode of other components in the second node 20, such as of one or more processors 27 or the slave clock controller 23. In the example of FIG. 2, for instance, a processor 27 is connected with a clock input 270 to the slave clock 22. A mode control input 271 of the processor 27 is connected to a control output 262 of the mode controller 26. The mode controller 26 can control the mode of the processor 27, and for example switch the processor 27 from a transmitting mode in which the processor 27 can transmit data to other nodes in the network 1 to a non-transmitting mode in which the processor 27 cannot transmit data. The processor 27 may for example, in the non-transmitting mode, still be able to process data received from other nodes in the network 1.

The slave clock time-base controller 21 may for instance be configured to change the operation mode when a period of time exceeding a threshold value has elapsed after the last time the time information has been received. Thereby, for example, it may be prevented that the second node 20 operates with an unreliable time base. In the example of FIG. 2, for instance, an input 260 of the mode controller 26 is connected to a timer 24. The timer 24 may indicate the period of time lapsed after the last reception of time information, e.g. of a time message from the selected master node. The mode controller may reset the timer each time the time information from the selected master clock 112 is received. The mode controller 26 may compare the lapsed period of time indicated by the timer 24 with a time-out threshold value. The time-out threshold value may for instance be set to a value corresponding to the time interval between successive time-information messages from a source of the time information which periodically transmits the time information. The mode controller 26 may switch the respective components, such as the processor 27 and/or the clock controller 23 to another mode, such as the non-transmitting mode, when the period indicated by the timer 23 exceeds the time-out threshold value. The mode controller 26 may for instance switch the processor 27 to the non-transmitting mode and switch the slave clock controller 23 to a time-base selection mode in which the slave clock controller 23 selects a suitable master clock, for example by selecting the master clock from which time-information is received the first after the slave clock controller 23 has been put in the selection mode.

Figure 4:
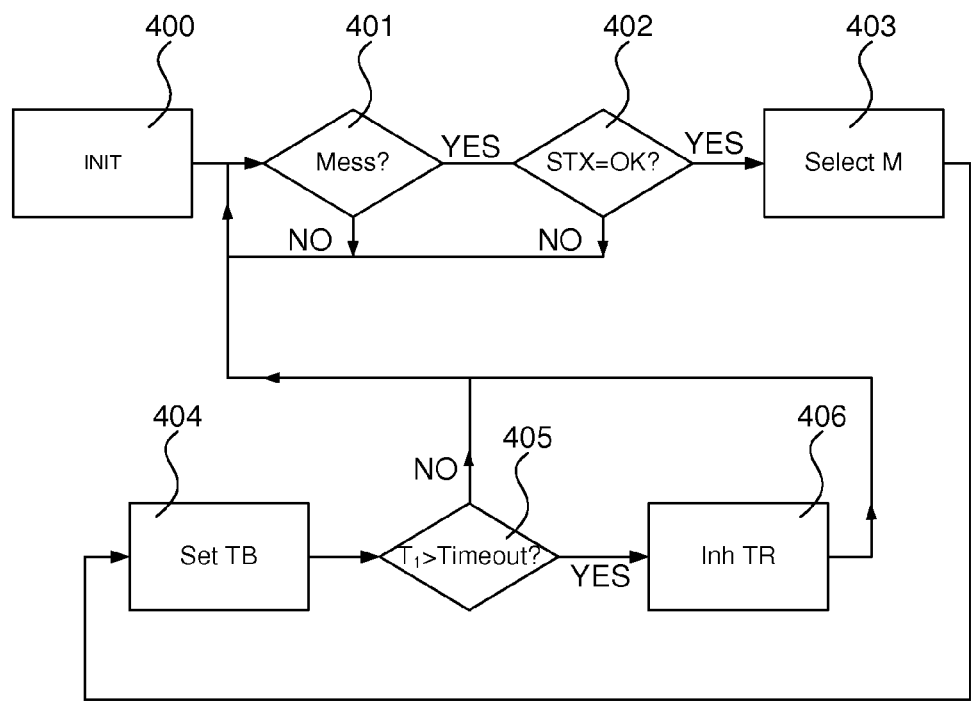
FIG. 4 schematically a flow-chart of an example of a method for synchronising a second node.

FIG. 4 schematically shows a flow chart of an example of a method which may be performed. As shown in FIG. 4, after an initialisation step 400, it may be determined, as illustrated with decision block 401, whether or not a message containing time-information about a time-base of a master clock has been received. When no such message is received, decision block 401 may be performed again. When a message has been received, as illustrated with decision block 402, it may be determined whether or not the message is syntactically correct. When the message is syntactically incorrect, as indicated with the arrows, the flow is returned to decision block 401 again. When the message is correct, the master clock 112 to which the time-information relates may be selected as the selected master clock, as indicated with block 403 in FIG. 4. The time base TB of the slave clock may then be set to the time-base indicated in the message, as indicated with block 404 in FIG. 4. If, as indicated with block 405 in FIG. 4, a time-out period has elapsed after reception of the message, transmission of data by the second node 20 to which the slave clock 22 belongs may be inhibited, as is shown with block 406. Thereafter, the flow is returned to the decision block 401.

The synchronisation system 13 may be implemented in any manner suitable for the specific implementation. As for example shown in FIG. 6, the synchronisation system 13 may be implemented as separate from but, directly or indirectly, connected to the first nodes 11,12.

Figure 5:
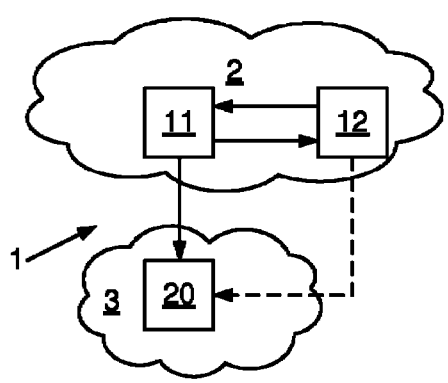
FIGS. 5-8 show examples of networks of first and second nodes.
Figure 6:
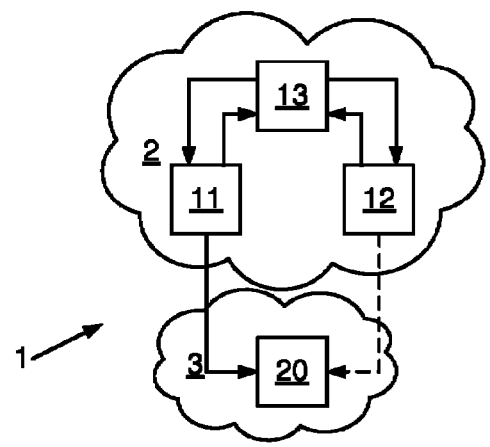

As shown in FIGS. 1, 5 and 6 the synchronisation system 13 may use information about the current time-base of the master clocks 112,122 to determine the time-base for the master clocks 112,122. For example, as indicated in FIG. 6 with the two-way arrows, the synchronisation system 13 may receive data about the current time-base from the respective nodes 11 and transmit data representing the determined time-base to the nodes 11 in which the respective master clock 112,122 is present. The synchronisation system 13 may for instance determine a common time-base from information about the master clocks 112. The synchronisation system 13 may be connected to the master clocks 112 and receive clock data which represents the information about the master clocks 112. As shown in FIG. 1, the network 1 may for example include two or more first nodes 11,12 connected to the synchronisation system 13 and which are able to transmit clock data to the synchronisation system 13. The synchronisation system 13 may determine the common time-base from the clock data received from the respective first nodes 11,12. The synchronisation system 13 may further control the master clocks 112,122 based on the determined common time-base. For example, the master clocks 112,122 may be synchronised by the synchronisation system 13 according to the determined common time-base. Thereby, a current time-base of a master clock 112 may be deemed to be the common time-base, because the master clock 112 is synchronized.

The synchronisation system 13 may be configured to determine the common time-base without using the time-base of one or more of the slave clocks 22. The synchronisation system 13 may be inhibited from using a time-base of the slave clock 22 of one, or more than one, or all the second nodes 20 to determine said common time-base in any suitable manner. For instance, in the example of FIG. 1, the second clocks 22 may be connected to the bus 14, via the slave clock time-base controller 21, only to receive the time-base information via the network 1 and be inhibited from transmitting information to the synchronisation system. Accordingly, the synchronisation system 13 may be arranged to determine the common time-base without, at least partially, using the time-base of one or more of the slave clocks 22. Thereby, the slave clocks 22 can be prevented from affecting the common time-base and accordingly from affecting the synchronisation of the first nodes 11,12. For instance, the synchronisation system 13 may be configured to use time-base data from a set of selected nodes only, which set excludes the second nodes 20 present in the network 1. The inhibited slave clocks 22 may for example be present in second node(s) 20 which are of a less reliable type or be less critical to the network 1. For instance, in case the accuracy of the slave clocks 22 is less than the accuracy of the master clocks 112,122, the respective slave clocks 22 may be inhibited. Thereby, the accuracy of the common time-base may be increased. Also, in case the second nodes 20 have a relatively high risk of failure, the slave clocks 22 in these second nodes may be inhibited. Thereby, the chance that a break down of a node affects the synchronisation may be reduced.

As illustrated in FIGS. 1 and 5, the synchronisation system 13 may, for example, include a separate synchronisation unit 113,123 connected to a respective master clock 112,122. The synchronisation unit 113,123 may for example be present in the same first node 11,12 as the respective master clock 112, 122. Each of the first nodes 11,12 may be able to transmit clock data to one or more of the other first nodes 11,12. The synchronisation unit 113,123 in the respective receiving first node 11,12 may determine a common time-base from the thus received clock data from one or more of the other first nodes 11,12. The master clocks 112,122 of the first nodes 11,12 in the network 1 may be synchronised by the respective synchronisation unit 113 according to the determined common time-base.

The first nodes 11,12 may for example transmit to other first nodes 11,12 clock data representing a current state of the master clock(s) 112,122 belonging to the respective node. The first nodes 11,12 may further send the clock data to the second nodes 20. The first nodes 11,12 may e.g. as mentioned transmit a broadcast message to the nodes 11,12,20 in the network 1. The broadcast message may include the current time indicated by the local clock(s) 112 of the respective first node 11. The synchronisation unit 113,123 in the respective receiving first node 11,12 may then determine a common time-base from the data in the message. The synchronisation unit 113,123 in the respective receiving first node 11,12 may for example determine an average of the current time indicated in the received messages and use the average as the common time. However, the synchronisation unit 113,123 may determine a common time in any manner suitable for the specific implementation. For instance, in case the first nodes 11,12 are compliant or compatible with the FlexRay standard, the synchronisation unit 113,123 may, for example, determine a common time in a manner compliant or compatible with the FlexRay standard.

The master clocks 112,122 in the network 1 may be synchronised by the respective synchronisation unit 113 according to the determined common time-base. Thus, the master clock 112 may be, within a margin or error, similar to the common time-base and accordingly, the current time indicated by a, synchronised, master clock 112 may be deemed to be the common time-base. The master clocks 112,122 may be synchronised by the respective synchronisation unit 113,123 to the common time-base in any manner suitable for the specific implementation. For example, one or more other parameters of the master clock 112,122, such as frequency and/or phase, may be set by the respective synchronisation unit 113,123 to a value corresponding to the common-time base. For instance, the time of the master clock 112,122 may be set to a time-stamp included in a message received at the respective node 11,12. Also, for instance, the synchronisation of the master clocks 112,122 of the respective first node 11,12 may include comparing the state of the master clock 112,122 with the determined common time-base, and adjusting one or more parameters of the master clock 112,122 when a predetermined adjustment criterion is satisfied. For example, the time of the master clock 112,122 may be adjusted when the difference between the state of the respective master clock 112,122 and the determined common time-base exceeds a predetermined adjustment criterion.

The second sub-network 2 may include two or more second nodes 20. In such case, the second nodes 20 may have the same selected master clock 112. However, it is also possible that the second nodes 20 each have a different selected master clock 112. Thereby reliability of the second sub-network 3 may be improved.

The second nodes 20 may for example include a selection unit which determines the selected master clock 112 based on one or more suitable selection criteria. Thereby, the reliability may be improved since the second nodes 20 can select a suitable selected master clock 112 depending on the specific configuration of the network 1 or conditions in the network 1. The selection unit may for example select the node 11 corresponding to the selected master clock 112 during initialization and maintain the selection of the selected master clock 112 during the entire operation. For example, the unit may select the first nodes 11 from which the second synchronisation data is received prior to the synchronisation. The selection unit may also dynamically select the node 11 during operation of the second node 20.

Alternatively, the selection of the selected master clocks 112,122 may, for example, be preconfigured prior to the operation of the respective second node 20. Thereby, the construction of the second node 20 may be of a relatively simple design. The second node 20 may for instance include a writable or non-writable memory (not shown in FIG. 1) in which an identification of the first nodes 11 with the selected master clocks 112 is stored. The identification may for example be stored during manufacturing or in an adaptive mode configuring the node after manufacturing of the respective second node. Also, the memory may for example be a writable memory which can be written before the second node 20 is connected to the network 1. Thereby, the second node 20 may be flexible, since the memory can be configured to match the specific type of network 1, while the design of the second node 20 may remain relatively simple.

Figure 7:
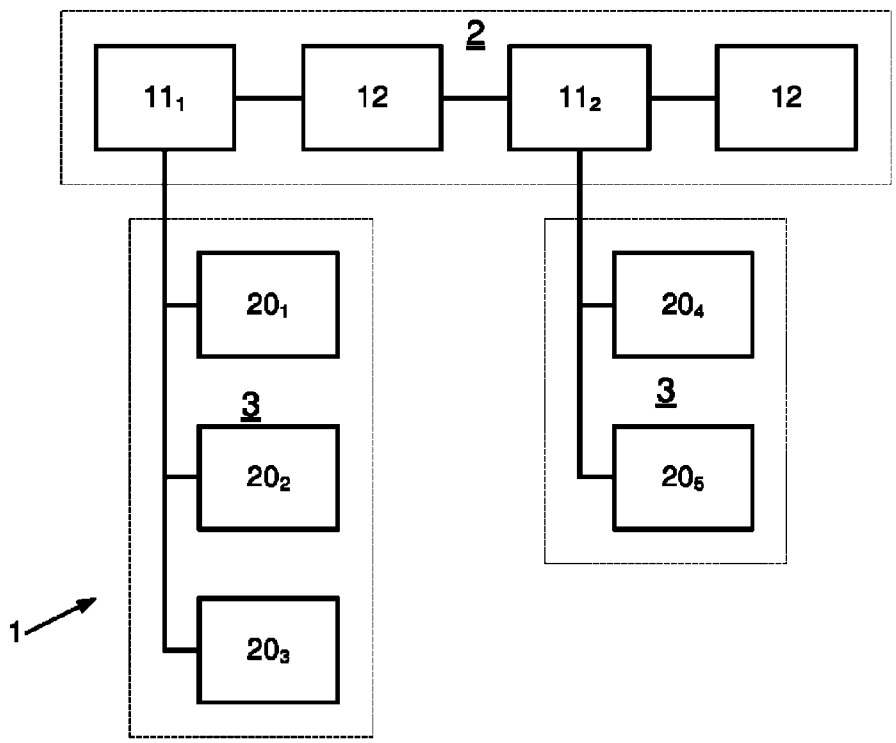

The network 1 may include two or more slave clocks controlled by one or more slave clock time-base controllers 21 based on selected clock synchronisation data derived from time information of different selected master clocks 112. For instance, as shown in FIG. 7, some second nodes $20_1 \ldots 20_3$ may have selected the master clock belonging to a first node $11_1$ and some second nodes $20_4, 20_5$ may have selected the master clock belonging to another first node $11_2$. The first nodes $11_1, 11_2$ may for example act as a gateway to the first sub-network 1 for the respective second nodes $20_1 \ldots 20_3$; $20_4, 20_5$. Thereby, for example, the first sub-network 1 and the second sub-network 2 may operate according to different network protocols. For example, the first sub-network 1 may be fully compliant with the FlexRay standard, and the second sub-network 2 may be compatible, but not compliant with the FlexRay standard.

Figure 8:
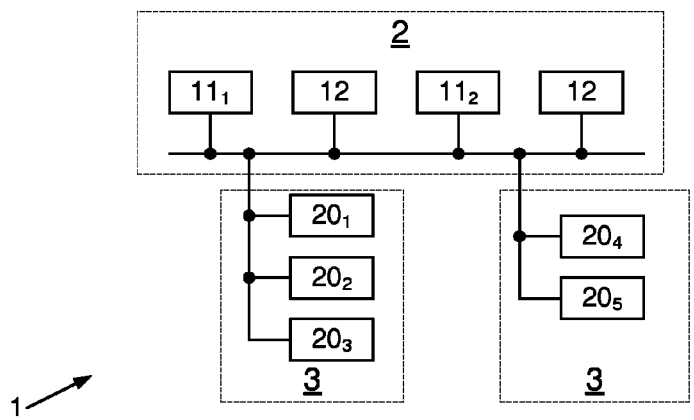

As shown in FIG. 7, the second sub-network 2 may be physically separated from, but connected to the first sub-network 2, e.g. via the gate way nodes $11_1, 11_2$. However, as shown in the representation in FIG. 8 of an example of the physical topology of the network 1, the first sub-network 2 and the second sub-network 3 may share network resources and hence not be separated physically from each other. The sub-networks 2,3 may for example share the data communication connections between the nodes $11_1, 11_2, 20_1 \ldots 20_3$; $20_4, 20_5$. In such case, the second sub-network 3 may be regarded as a virtual sub-network.

Figure 3:
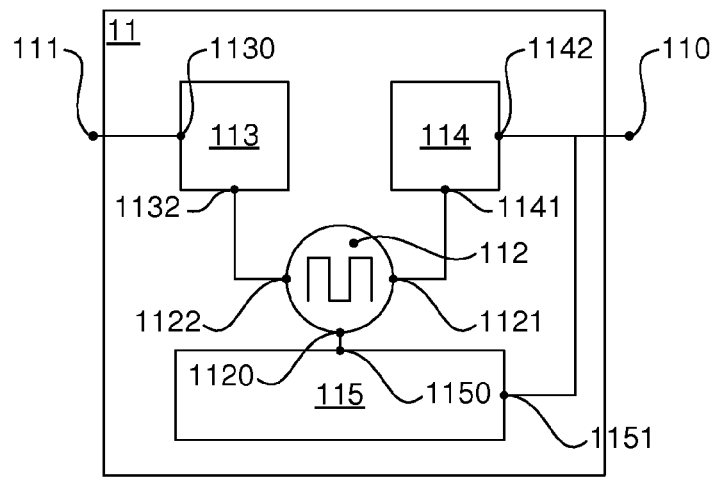
FIG. 3 shows a block diagram of an example of an embodiment of a first node.

FIG. 3 schematically shows an example of a first node 11 suitable to be used in the example of a network 1 shown in FIG. 1. As shown in FIG. 3, the first node 11 may include an master clock 112 which can generate a clock signal. The first node 11 may further include a processor 115 may be connected with a clock input 1150 to an output 1120 of the master clock 112. At the output 1120 of the master clock 112, a clock signal may be outputted. The outputted clock signal can be used by the processor 115, for example to schedule or time the processing of data. The processor 115 may have a processor input/output port (I/O) 1151 which is connected to the communication port 110. At the processor I/O 1151, the processor 115 may, for example, output data to other nodes or receive data from other nodes, via the communication port 110 and the bus 14 for example.

As shown in FIG. 3, the first node 11 may include a synchronisation unit 113 connectable to one or more other first nodes 11,12 and connected to the master clock 112. The synchronisation unit 113 may receive timing information about the timing of one or more of the other first nodes 11,12 and determine a common time-base using the received timing information. The master clock 112 may subsequently be adjusted to the common time-base. For example, the synchronisation unit 113 may adjust the master clock 112 when a difference between the timing of the master clock 112 and the common time-base exceeds a threshold or set the state of the master clock 112 to the determined common time-base. In the example of FIG. 3, the synchronisation unit 113 is connected with a controller input 1130 to the synchronisation port 111. The synchronisation port 111 may be connected to the other first nodes 11,12. e.g. via the bus 14. In this example a separate synchronisation port 111 is shown for illustrative purposes. However, it will be apparent that the synchronisation port 111 and the communication port 110 may be the same. The synchronisation unit 113 can receive the timing information from other first nodes 11,12 the controller input 1131. The synchronisation unit 113 is connected with a controller output 1132 to a control input 1122 of the master clock 112. The synchronisation unit 113 can adjust the master clock 112 based on the determined common time-base, by transmitting the clock control signal to the control input 1122.

The first node 11 may include, as shown in FIG. 3, a slave synchronisation unit 114. The slave synchronisation unit 114 can generate a slave clock synchronisation signal based on the common time-base. In the example of FIG. 3, for instance, the slave synchronisation unit 114 is connected with an input 1141 to a clock output 1121 of the master clock 112. The slave synchronisation unit 114 is connected with an output 1142 to the communication port 110 of the first node 11. Timing information from the master clock contains information about the common-time base, since the master clock 112 is synchronised to the common time-base. The slave synchronisation unit 114 can receive timing information from the master clock 112, and hence information about the common time-base, to generate the slave synchronisation signal. For example, the slave synchronisation unit 114 may transmit to at least the second nodes 20 a slave clock synchronisation signal which includes the time of the master clock 112.

In this example a slave synchronisation unit 114 is shown for illustrative purposes. However, it will be apparent that the node 11 may include a unit which simultaneously synchronises master clock 112 and outputs a synchronisation signal to the second nodes 20, for example by simultaneously transmitting a determined common time base to the master clock 112 and the slave clocks 22.

The network 1 may be any type of network suitable for the specific implementation. For example, the network may be used to control and/or monitor an aspect of the operation of one or more apparatuses. For example, one or more of the nodes in the network 1 may be control nodes that control or monitor aspects of the operation of an apparatus, such as a vehicle, a robot or other type of apparatus. For instance, the first nodes 11 may control or monitor aspects which require a high reliability, and the second nodes 20 may control or monitor aspects which require a lower reliability. The first nodes 11 may for example required for operation of the apparatus and the second nodes may control aspects that, when not controlled, will not result in a failure of the overall apparatus. For example, the network 1 may be part of a braking system and the first node may e.g. control the breaking pedal whereas the second nodes may each control the brake on a wheel. Accordingly, if one of these second nodes fails the whole system is still working whereas if the first node is not working the whole breaking system will not function at all. The first nodes 11 may for example be controlling an airbag system, a braking system, a seat belt or be part of an air traffic control system, a fly-by-wire system, a life support system or form a central control node in a control system. The second nodes may for example be not-safety critical and for example control the opening of locks or monitor the pressure in a tyre.

Figure 9:
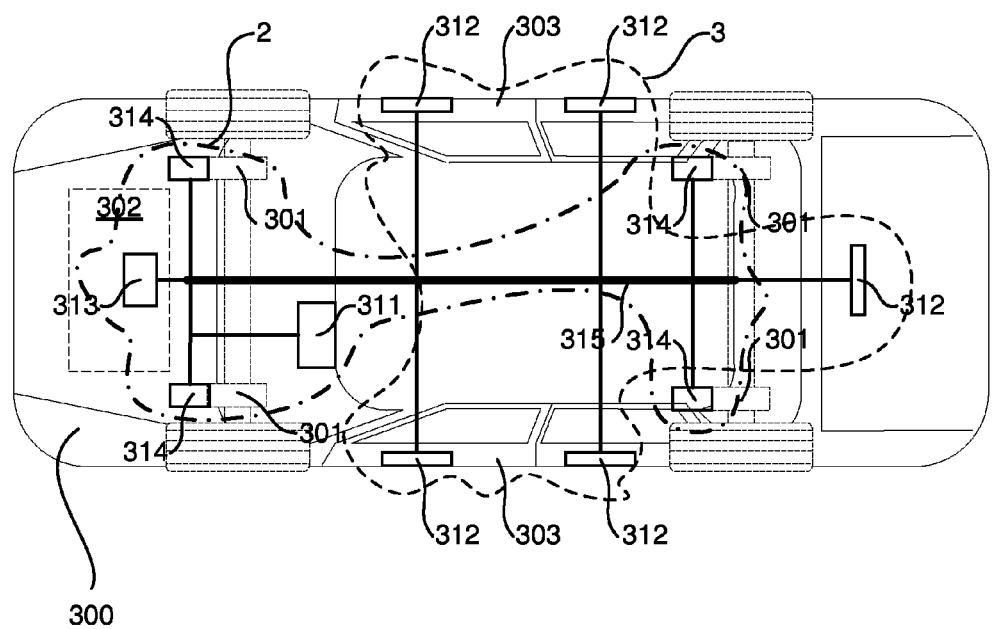
FIG. 9 shows a schematic top-view of an example of a vehicle provided with an example of a network.

For instance, FIG. 9 shows an example of vehicle 300 provided with safety-critical nodes. The example shown in FIG. 9 includes an engine 302. An engine control node 313 is present which can control and monitor the engine 302. The vehicle further has break control nodes 314 which can control and monitor the breaks 301. The vehicle 300 further has door lock control nodes 312 which can actuate the locking and unlocking of doors 303 of the vehicle 300. The nodes 312-314 are connected to a control node 311 via a connection 315. At the human control node 311, data can be inputted by a driver of the vehicle, for example by pressing with his or hers foot on a pedal, to control operation of second nodes 20. It will be apparent that when the human control node 311, e.g. the brake pedal, fails this may lead to in death or serious injury to people and/or loss or severe damage to the vehicle, whereas if the door lock control nodes 312 or the engine control node 313 does not function, the consequences are less serious. Accordingly, the human control node 311 may be implemented as a first node and the door lock control nodes 312 as second nodes.

The invention may be implemented as a kit of parts. The kit may be provided as a set of separate components which can be connected to each other to assemble, for example a time-base controller or to assemble a first node or a second node. The invention may also be implemented in a computer program for running on a computer system, at least may include code portions for performing steps of a method according to the invention when run on a programmable apparatus, such as a computer system or enabling a programmable apparatus to perform functions of a device or system according to the invention. Such a computer program may be provided on a data carrier, such as a CD-ROM or diskette, stored with data loadable in a memory of a computer system, the data representing the computer program. The data carrier may further be a data connection, such as a cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the network may be used to control an apparatus, and for example include an industrial control system of form part of a manufacturing system. Also, the network may be compliant or compatible with one or more standards in the group consisting of: FlexRay, Time Triggered Protocol/Class C (TTP/C), time-triggered communication on CAN (Controller Area Network) protocol (TTCAN).

Furthermore, the connections may be an type of connection suitable to transfer signals from or to the respective nodes, units or devices. The connections may for example be direction connections or indirect connections. Furthermore, the clocks 11,12,20 may, for example, be implemented as an internal clock of a node or as an external clock connected to a node.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the second node 20 may be composed of separate components, e.g. integrated circuits, connected to each other to cooperate as the second node 20.

Also, devices, units or components functionally forming separate devices, units or components may be integrated in a single physical device. For example, in FIG. 2 two separate second node inputs 201,202 are shown for illustrative purposes. However, the second node 20 may have a single physical node input connected to e.g. a network module which separates signals from different first nodes 11, e.g. based on the network address from which the respective signals originate. Also, for example, the clock controller 23 and/or the state controller 24 and/or the memory 25 and/or the mode controller 26 may be implemented as a single integrated circuit.

However, other modifications, variations and alternatives are also possible. The specifications and drawings are, accordingly, to be regarded in an illustrative rather than in a restrictive sense. In the claims, any reference signs placed between parentheses shall not be construed as limiting the claim. The word 'comprising' does not exclude the presence of other elements or steps then those listed in a claim. Furthermore, the words 'a' and 'an' shall not be construed as limited to 'only one', but instead are used to mean 'at least one', and do not exclude a plurality. The mere fact that certain measures are recited in mutually different claims does not indicate that a combination of these measures cannot be used to advantage.

What is claimed is:

1. A data communication network comprising:
    at least two master clocks; and
    a synchronisation system connected to said master clocks for receiving timing information from said at least two master clocks, said synchronisation system being arranged to determine a common time-base for said master clocks based on said timing information and to control said master clocks according to said determined time-base;
    wherein said data communication network includes at least one slave clock which is controlled by a slave clock time-base controller based on time information of a single selected master clock selected from said at least two master clocks.

2. A network as claimed in claim 1, wherein said slave clock time-base controller can receive time information of at least two master clocks and is arranged to select said selected master clock based on said received time information.

3. A network as claimed in claim 2, wherein said slave clock time-base controller is arranged to select, as said selected master clock, a master clock from which said time information is received first.

4. A network as claimed in claim 1, wherein said slave clock time-base controller is preconfigured, prior to operation of the slave clock time-base controller to select, as said selected master clock, a pre-selected one of said master clocks.

5. A network as claimed in claim 1, including at least two slave clocks controlled by at least one slave clock time-base controller.

6. A network as claimed in claim 1, wherein said synchronisation system includes at least two synchronisation units each connected to a respective master clock;
which synchronisation units are arranged to transmit a synchronisation message to at least said slave clock time-base controller, said synchronisation message including said time information; and
wherein said slave clock time-base controller is arranged to control said slave clock based on time information in a synchronisation message received from a synchronisation unit belonging to said selected master clock.

7. A network as claimed in claim 6, wherein said synchronisation units are connected to each other and are arranged to exchange said synchronisation messages, said synchronisation units being arranged to control said master clock based on the time information in the received synchronisation messages.

8. A network as claimed in claim 6, wherein said synchronisation units are arranged to broadcast said synchronisation messages in at least a part of said network.

9. A network as claimed in claim 1, wherein said slave clock time-base controller is arranged to control an operational mode of a unit which includes at least one of said slave clocks.

10. A network as claimed in claim 1, including a source of said time information which is arranged to periodically transmit said time information and wherein said time-base controller is arranged to change said operational mode when a period of time exceeding a threshold value has elapsed after a previous time the time information has been received.

11. A network as claimed in claim 1, including a first sub-network which includes said master clocks and a second sub-network including at least two slave clocks, said second sub-network being connected to said first sub-network via a gateway, said gateway including a gateway master clock and said at least two slave clocks being controlled by the slave clock controller based on time-base information from said gateway master clock.

12. A network as claimed in claim 1, including at least two slave clocks controlled by at least one slave clock time-base controller based on selected clock synchronisation data derived from time information of different selected master clocks.

13. A network as claimed in claim 1 wherein said synchronisation system is inhibited from using a time-base of said at least one slave clock to determine said common time-base.

14. A network as claimed in claim 1, wherein said network is compliant or compatible with at least one standard in the group consisting of: FlexRay, TTCAN, TTP/C.

15. A network as claimed in claim 1, wherein said synchronisation system has an input for receiving clock data representing time base information from said master clocks, and wherein said synchronisation system is arranged to determine a common time-base based on said time information from said master clocks and to control said master clocks based on the determined common time-base.

16. A network as claimed in claim 1, wherein said synchronisation system includes at least two nodes, said nodes including each at least one synchronisation unit, which synchronisation unit is connected to at least one other node for receiving from said other node timing data representing information about the master clock of said other node and determining a common time-base from the received timing data.

17. A non-transitory computer readable medium stored with data loadable in a memory of a programmable apparatus, said data including program code for performing a method when executed by said programmable apparatus, said method including:
receiving timing information from said at least two master clocks;
determining a common time-base for at least two master clocks based on the received timing information; and
controlling said master clocks according to said determined time-base;
controlling at least one slave clock based on time information of a single selected master clock, said single selected master clock being selected from said at least two master clocks.

18. A network as claimed in claim 2, including at least two slave clocks controlled by at least one slave clock time-base controller.

19. A network as claimed in claim 2, wherein said synchronisation system includes at least two synchronisation units each connected to a respective master clock;
which synchronisation units are arranged to transmit a synchronisation message to at least said slave clock time-base controller, said synchronisation message including said time information; and
wherein said slave clock time-base controller is arranged to control said slave clock based on time information in a synchronisation message received from a synchronisation unit belonging to said selected master clock.

20. A network as claimed in claim 3, including at least two slave clocks controlled by at least one slave clock time-base controller.

* * * * *